United States Patent Office 3,217,851
Patented Nov. 16, 1965

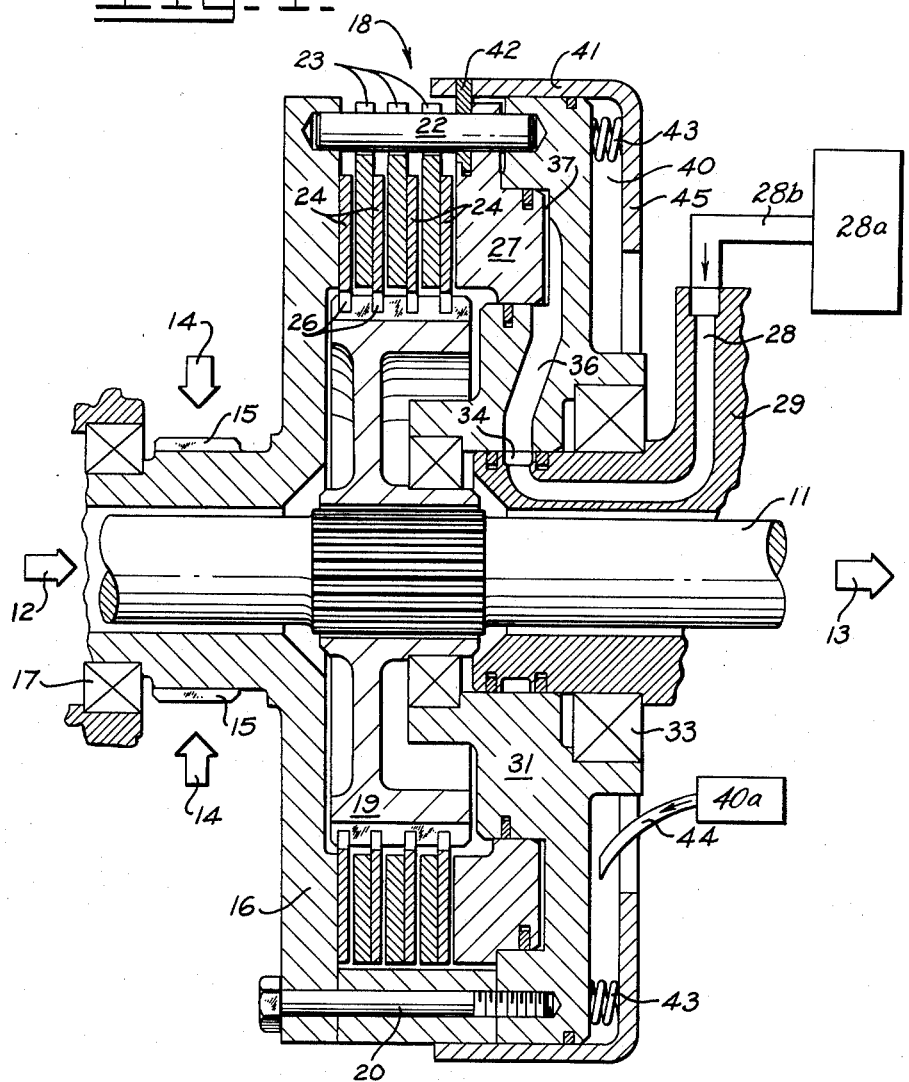

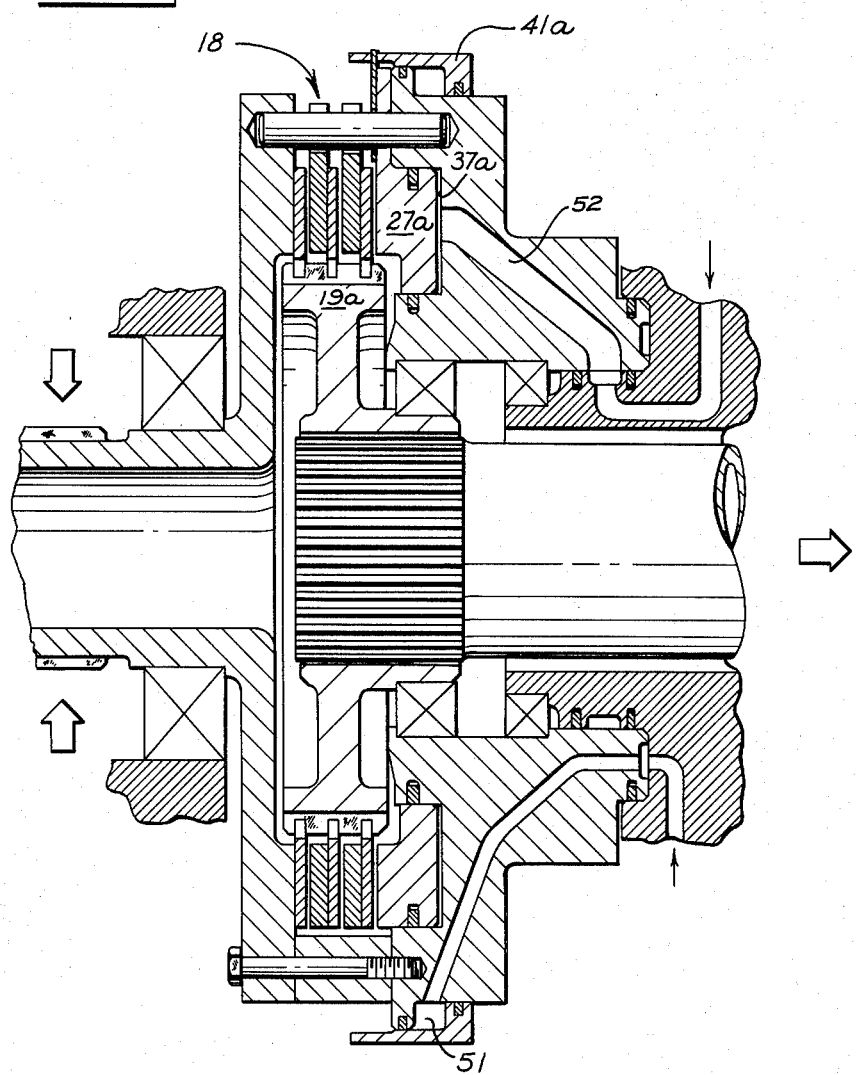

3,217,851
FLUID-ACTUATED ROTATING CLUTCH
Karl J. Mogk, Naperville, Seth P. Nordling, Washington, and Charles A. Ramsel and Gerald D. Rohweder, Peoria, Ill., assignors to Caterpillar Tractor Co., Peoria, Ill., a corporation of California
Filed Jan. 23, 1962, Ser. No. 168,124
2 Claims. (Cl. 192—85)

The present invention relates to hydraulically operated rotating clutches and more particularly to a hydraulically operated rotating clutch having means for providing counterbalancing forces for positive clutch disengagement.

The hydraulic systems employed in rotating clutches usually employ a source of hydraulic fluid under high pressure for the purpose of effecting clutch engagement. A difficulty encountered in the use of rotating clutches of this type is their tendency to remain engaged even in the absence of hydraulic pressure from the source. This is generally due to the fact that the entire clutch rotates at a high rate of speed, creating force, due to the centrifugal action of trapped actuating fluid which is sufficient to maintain the clutch engaged.

One method used to counteract this problem employs the use of a double acting clutch mechanism; that is, one which provides pressurized hydraulic fluid to engage the clutch, and which allows disengagement by disconnecting the pressure source in combination with interacting fluid chambers, orifices, large springs and the like. This method, while satisfactory for double clutch purposes, is complex and does not lend itself toward adaptation to a single acting, self-neutralizing clutch.

Accordingly, it is an object of the present invention to provide a hydraulically actuated rotating clutch having a counterbalancing disengaging mechanism operable by a low pressure hydraulic fluid source.

Further and more specific objects and advantages of the invention are made apparent in the following specification wherein the preferred form of the invention is described by reference to the accompanying drawings.

In the drawings:

FIG. 1 is a central sectional view of a clutch embodying the present invention; and FIG. 2 is a sectional view of a clutch similar to that of FIG. 1 illustrating an alternate embodiment of the invention.

The invention is disclosed in FIG. 1 in connection with a clutch employed for connecting a supplemental source of power to a shaft already receiving rotational forces from a primary source. It will be clear, however, that the invention is equally applicable where the clutch is employed to connect the only source of driving power to a shaft (such as shown by FIG. 2) as well as other clutch uses.

Referring to FIG. 1, a shaft 11 receives torque represented by arrow 12 at one end and delivers torque represented by arrow 13 at its other end. An additional source of torque represented by arrows 14 is applied to a gear 15 on driving member 16 which is disposed coaxially with shaft 11 and is supported on bearing 17. Driving member 16 forms the forward part of rotating clutch 18 which interacts with a driven member 19 splined on shaft 11. Thus when rotating clutch 18 is engaged, the torque 14 applied to member 16 is transmitted to member 19 and thus to shaft 11 so that output torque 13 is a function of both input torque 12 and input torque 14. When rotating clutch 18 is disengaged, the rotation of member 16 is not imparted to member 19 and output torque 13 is a function of input torque 12 alone.

A plurality of bolts 20 along with dowel members 22 secure driving member 16 to the various components of clutch 18 such that rotation of member 16 induces rotation of the clutch in both the engaged and disengaged conditions. Clutch plates 23 are keyed to dowels 22 for axial sliding movement with respect thereto and rotation therewith. Clutch plates 23 are coaxial with and alternately disposed between a plurality of clutch discs 24 which are keyed to member 19 through suitable interlocking teeth 26. Clutch plates 23 rotate freely past alternate discs 24 when the clutch is disengaged. When the clutch is engaged, however, clutch plates 23 and clutch discs 24 are compressed together by annular piston 27 such that relative rotation therebetween is prevented. A path for the transmission of torque from member 16 to shaft 11 through member 19 is thereby provided.

Piston 27 is slidable on dowels 22 such that upon axial movement thereof the clutch plates and clutch discs engage one another. The clutch engaging motion of piston 27 is provided by hydraulic fluid under high pressure acting against one face of the piston. The hydraulic fluid is provided from a source 28a and delivered through a fluid line 28b to a duct 28 in a stationary support member 29. A piston reaction member 31 forms the rearward part of clutch 18 by means of bolts 20 and is rotably supported on bearing 33 affixed to support member 29. Duct 28 delivers hydraulic fluid to an annular groove 34 in member 29 which registers with a fluid passage 36 in reaction member 31. Passage 36 thereby receives fluid from recess 34 and transmits it to a piston chamber 37 in member 31. Member 31 being axially fixed, the high pressure fluid in chamber 37 operates to urge the axially movable piston toward the clutch plates and clutch discs causing engagement thereof.

When shaft 11 is driven by torque 12 alone and it is desired to add torque 14 to the output torque 13, hydraulic fluid under pressure is introduced to duct 28 where it is delivered to piston 27 via pasage 36 inducing piston 27 to move axially and engage clutch plates 23 and clutch dics 24. When it is then desirable to disengage the clutch so as to remove the effect of torque 14 upon shaft 11, it is not sufficient to merely reduce the pressure applied to duct 28 as would be expected. This is due to the fact that centrifugal force acting on trapped fluid in passage 36 and piston chamber 37 maintains the clutch engaged as long as the clutch rotates at a high speed.

To provide means for overcoming the effect of the fluid in rotating passage 36 and chamber 37 when disengagement is desired, a cup member 41 is disposed concentrically about reaction member 31 and in sliding contact with the outer circumferential surface thereof. A plurality of connection members 42 secure cup member 41 to piston 27 so that they move axially as one unit. The radially extending portion 45 of cup member 41 is disposed at a distance from reaction member 31 forming an annular compartment 40 therebetween. A plurality of springs 43 are secured between cup portion 45 and reaction member 31 such that springs 43 are in compression when the clutch is engaged. Since the position of reaction member 31 is axially fixed, the force of the compressed springs acts to urge cup 41 to the right thereby acting against the forces of the fluid in rotating passage 36 and chamber 37.

From a source 40a of low pressure fluid, such as that which supplies motor lubricating oil, a counterbalancing quantity of fluid is provided in compartment 40 through a tube 44 or the like. The centrifugal force acting on the fluid in the compartment, together with the force of springs 43, act to urge cup member 41 toward the right. The connection between the cup member and piston 27 causes the piston to also move to the right, resulting in clutch disengagement. The amount of force supplied by the rotating fluid in compartment 40 is dependent upon the distance which portion 45 of member 41 extends radially inward (assuming maintenance of maximum fluid level) and need only be sufficient to counteract the forces produced by the rotating fluid in passageway 36 and chamber 37. When the forces produced by the two rotating quantities of fluid are equal, springs 43 will be able to disengage clutch 18 in the absence of high pressure to the piston. Springs 43 also serve to disengage the clutch when the transmission is not rotating.

By the use of a counterbalancing fluid compartment rather than a double acting piston, the present invention provides positive clutch disengagement means through the use of a readily available source of fluid and simple mechanical components.

Referring now to FIG. 2, an alternate embodiment of the invention employs an enclosed annular compartment 51 supplied with fluid a low pressure source (not shown) to counterbalance the forces developed by the rotating fluid in passageway 52 and piston chamber 37a which prevent disengagement of the clutch 18. In all other respects the embodiments are essentially the same.

We claim:

1. In a hydraulically operated, rotating clutch having a chamber for a quantity of fluid acting to induce clutch engagement during continued clutch rotation after reduction of the supply pressure of said fluid, the combination comprising:

means forming an annular compartment independent of said chamber and concentric with said clutch and rotating with the same; and means for supplying said compartment with a low pressure fluid independent of said first-named fluid and counteracting, by virtue of the centrifugal force of said low pressure fluid in said compartment when said clutch rotates, the force of said first-named fluid during said rotation of the clutch after said reduction.

2. In a hydraulically operated, rotating clutch, the combination comprising:

a rotatable piston for urging the clutch into engagement, said piston rotating when the clutch rotates;

a piston chamber forming member secured to rotate with said piston and having a fluid passage therein, means for connecting said passage to a source of high-pressure fluid for delivery thereof to said chamber to urge said piston into clutch engagement position, said means being operative to effectively disconnect said source from said passage when clutch disengagement is desired, said passage and said piston chamber being disposed to enable fluid in said passage and in said piston chamber to exert forces on said piston in the direction of clutch engagement by virtue of the centrifugal force of said fluid when said clutch rotates after said source is disconnected; and a cup member connected to said piston and forming an annual compartment with said piston chamber forming member, said compartment having a central opening, the diameter of said opening being dimensioned to determine the maximum amount of fluid which can be carried by said compartment, means for connecting said compartment to a source of low-pressure fluid, said low-pressure source being independent of said first-named fluid source, the low-pressure fluid in said compartment exerting a force on said cup member by virtue of the centrifugal force of the rotating fluid in said compartment, said connection of said member to said piston enabling transmission of said last-named centrifugal force to said piston in the direction of clutch disengagement, said clutch disengagement forces being greater than said clutch engagement forces when said clutch is rotating after said high pressure source is effectively disconnected from said passage.

References Cited by the Examiner

UNITED STATES PATENTS

| | | |
|---|---|---|
| 2,381,786 | 8/1945 | Tyler. |
| 2,806,567 | 9/1957 | Bonquet _____ 192—86 X |
| 2,868,341 | 1/1959 | Snoy _____ 192—87 |
| 2,919,778 | 1/1960 | Aschauer _____ 192—86 |
| 3,007,562 | 11/1961 | Aschauer _____ 192—86 |
| 3,032,157 | 5/1962 | Richards _____ 192—87 |
| 3,064,780 | 11/1962 | Richards et al._____ 192—86 |

FOREIGN PATENTS

| | | |
|---|---|---|
| 1,223,807 | 2/1960 | France. |
| 379,460 | 8/1923 | Germany. |
| 444,414 | 5/1927 | Germany. |
| 490,131 | 1/1930 | Germany. |
| 551,623 | 3/1943 | Great Britain. |

DAVID J. WILLIAMOWSKY, *Primary Examiner.*

THOMAS J. HICKEY, *Examiner.*